United States Patent Office 3,419,318
Patented Dec. 31, 1968

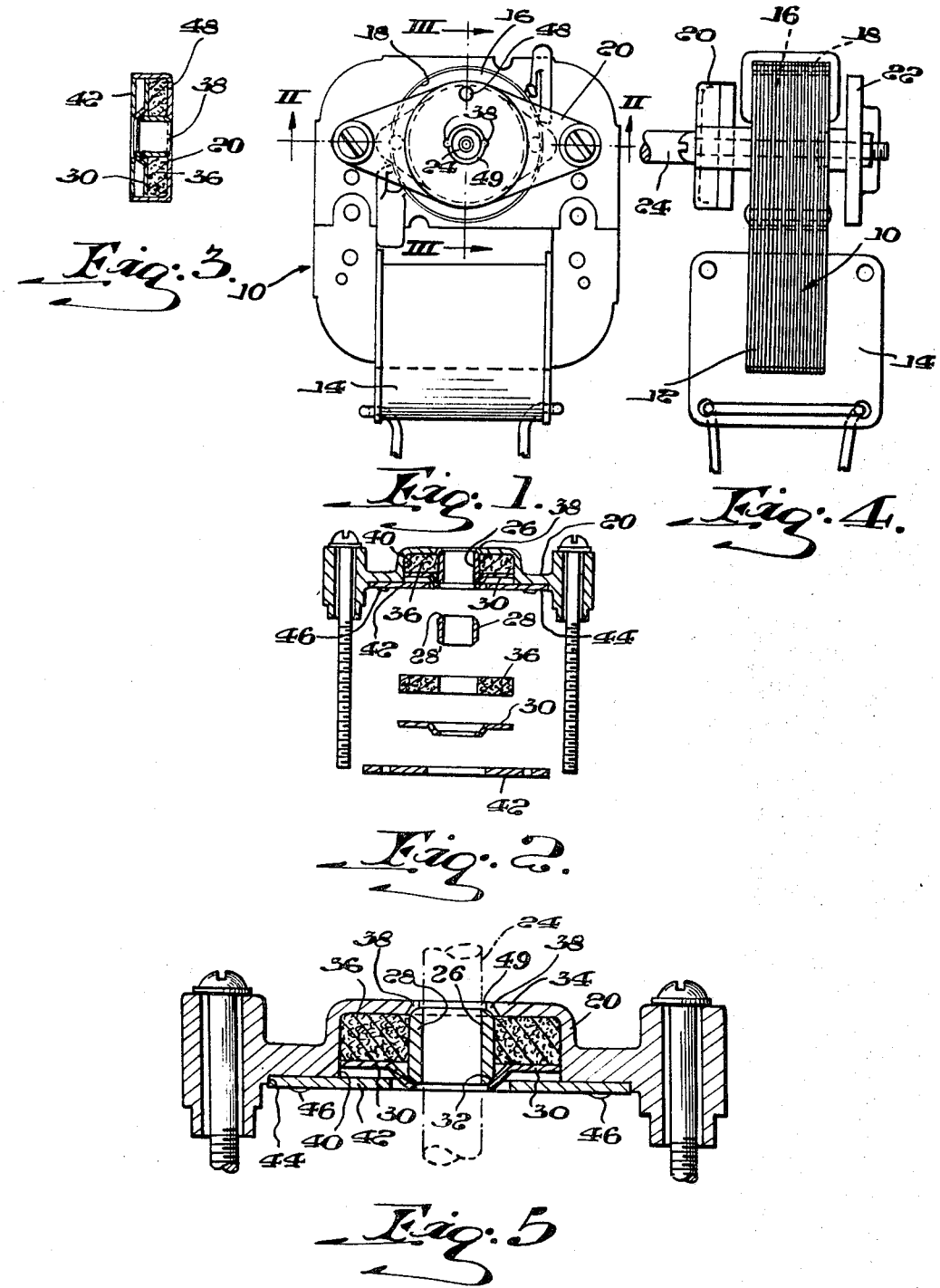

3,419,318
BEARING CONSTRUCTION
Earl F. Harter, Lutherville, Md., assignor to The General Industries Company, Elyria, Ohio, a corporation of Ohio
Filed June 10, 1965, Ser. No. 462,908
1 Claim. (Cl. 308—132)

ABSTRACT OF THE DISCLOSURE

There is disclosed herein a bearing structure for an electric motor comprising a spherical type bearing retained at one end by a socket having an aperture therein for receiving the motor shaft, said aperture being larger than the shaft projecting therethrough and being notched at its periphery to allow recirculation of lubricant.

---

This invention relates to a bearing construction, and more particularly to a bearing construction having new and improved lubricating structure for insuring adequate lubrication of the bearing surfaces.

In previous constructions, there have been provided structures for permanently lubricating the bearing structures in which the lubricant is supplied from a wick which carries the lubricant into the vicinity of the working surfaces of the bearing and effects lubrication of such working surfaces during the operation of the device. An example of a small bearing which utilizes this principle is shown in U.S. Letters Patent No. 2,213,333 issued Sept. 3, 1940, to Mr. Alwin C. Borchers. The present invention is an improvement on said basic Borchers construction in that it provides continuous lubrication for a spherical type bearing from a wick or felt pad which supplies lubricant to the bearing surface and is further adapted to prevent oozing or permanent loss of the lubricant from the working surfaces of the bearing so that the supply of lubricant is not readily dissipated. Such lubricant does not escape from the bearing surfaces and find its way to other parts of the mechanism to interfere with their operation.

It is one of the objects of the present invention to provide a return mechanism in conjunction with a spherical type bearing which will make more efficient use of the lubricant and specifically prevent loss of the lubricant during operation of the bearing.

It is another object of the invention to provide an improved bearing structure in which the lubricant is re-circulated, hence continuously reused to efficiently lubricate the bearing surfaces.

An over-all object of the present invention is to provide a novel bearing construction which is readily constructed and therefore economical both to manufacture and to use because the bearing surfaces are functional over a longer period without the necessity of re-lubrication over long intervals.

Other objects of my invention and the invention itself will become increasingly apparent from a consideration of the following description of the drawing, wherein:

FIGURE 1 is a top view of the apparatus incorporating the invention;
FIGURE 2 is an enlarged exploded view of the bearing structure shown separated from the apparatus;
FIGURE 3 is a section view taken on line III—III of FIGURE 1; and
FIGURE 4 is a side view taken, looking from the right hand side of FIGURE 1; and
FIGURE 5 is an enlarged view of FIGURE 2 with the parts assembled.

The invention is shown with a core 10 comprised of a number of laminations 12 having a coil 14 at one end thereof and a rotatable armature 16 at the other end thereof mounted for rotation within an opening 18 in the core 10. The armature is supported for rotation by a pair of brackets, one bracket 20 being the top bearing bracket and a complementary bracket 22 at the lower end. Shaft 24 of the armature extends through opening 26 in spherical type bearing 28 having surface portions 28′ defining spherical sectors, the outer surface of the spherical bearing being retained by a socket plate 30 having a spherical sector surface 32 which co-acts with a second spherical sector surface 34 in the bracket 20. Thus, the bearing is free to turn with universal movement and being capable of tilting angularly will readily adjust itself. The bearing surfaces are lubricated by a wick or porous pad of felt construction 36 which serves as a reservoir for lubricant, it being permeated by lubricant which oozes radially inwardly and communicates lubricant to the outer sector surfaces 28′ of the bearing 28. Two notches 38 which are diametrically disposed to each other, provide communication of lubricant to the spherical sectors of the bearing. These notch means also provide that lubricant which is carried out of the vicinity of the bearing will be carried back to the wick to prevent loss of lubricant from the system.

The bracket 20 has a socket or recess 40 which is dimensioned to receive the bearing 28 and socket plate 30, and the structure is retained by a retainer plate 42 which fits within a recess 44 and overlies the socket plate to hold it in position and also to urge the structure within the recess into clamping relation with each other. The plate 42 is held at its opposite ends by rivets 46.

In operation, lubricant is supplied to the wick through an access opening 48, or is put in the wick prior to assembly, said lubricant serving to permeate the wick and serve as a supply of lubricant for the bearing surface over a period of time. The supply extends over a substantial period since none of the lubricant is readily lost but is retained by means of an annular space or recess 49. Notch means 38 carry the lubricant back into the oil reservoir or wick surrounding the bearing, such lubricant being otherwise lost to the system. As a result, the system will be efficiently and continuously lubricated and the incidence of relubricating is substantially reduced. The lubricant travels in a continuous path with negligible waste and is continuously reused so that the bearing may be continued to be efficiently lubricated for a considerable period of time by the initial supply of lubricant carried by the saturated felt wick member or pad 36.

I find that there is little if any tendency for the lubricant to travel downwardly and be forced from the lower part of the bearing.

Although I have shown and described a preferred form of my invention, I contemplate that numerous and extensive departures may be made therefrom without departing from the spirit of my invention or the scope of the appended claim.

What I claim is:

1. A lubricant recirculating bearing structure comprising a bracket having a downwardly open socket and means providing an aperture through said bracket disposed centrally of said socket; a self-aligning, spherical type bearing having a central opening therein; said bearing having outer surface portions defining spherical sectors at its upper and lower ends outwardly of said central opening; said socket providing seating means for the upper end of said bearing; a seat member disposed within said socket and providing a seat for the lower end of said bearing; a retainer plate overlying said seat member and retaining said seat member in engagement with said bearing; an annular wick element disposed within said socket and completely surrounding said bearing and extending vertically substantially the entire vertical dimension of said bearing; a shaft projecting through said aperture and said opening and projecting above the upper end of said bearing; said aperture being diametrically larger than said shaft and affording an annular recess around said shaft for retaining lubricant carried outwardly along said shaft; the periphery of said aperture being notched radially over a portion of said wick whereby lubricant from said recess can return directly to said wick for recirculation to said bearing.

References Cited

UNITED STATES PATENTS

| | | | |
|---|---|---|---|
| 2,083,688 | 6/1937 | Clements | 308—132 |
| 2,308,610 | 1/1943 | Koch | 308—132 |
| 2,602,712 | 2/1952 | Johnston | 308—134.1 |
| 2,922,682 | 1/1960 | Abel | 308—132 |
| 1,263,205 | 4/1918 | Catucci | 308—134.1 |
| 2,135,308 | 11/1938 | Killam | 308—134.1 X |
| 2,714,539 | 8/1955 | Roddy | 308—134.1 |
| 2,770,505 | 11/1956 | Jordon | 308—72 |
| 2,800,374 | 7/1957 | Ernst | 308—132 |
| 2,819,933 | 1/1958 | Carrington | 308—72 |
| 3,109,684 | 11/1963 | Tupper | 308—240 X |
| 3,110,528 | 11/1963 | Parker | 308—240 X |
| 3,232,681 | 2/1966 | Mittmann et al. | 308—121 |

MARTIN P. SCHWADRON, *Primary Examiner.*

FRANK SUSKO, *Assistant Examiner.*

U.S. Cl. X.R.

308—134.1